US007688951B1

(12) United States Patent
Bajpay et al.

(10) Patent No.: US 7,688,951 B1
(45) Date of Patent: Mar. 30, 2010

(54) AUTOMATED RULES BASED PROACTIVE ALARM ANALYSIS AND RESPONSE

(75) Inventors: Paritosh Bajpay, Edison, NJ (US); Roberta A. Bienfait, Norcross, GA (US); Mojgan Dardashti, Holmdel, NJ (US); Hossein Eslambolchi, Los Altos Hills, CA (US); Jackson Liu, Middletown, NJ (US); John McCanuel, Bailey, CO (US); Zhiqiang Qian, Holmdel, NJ (US); Michael J. Zinnikas, North Brunswick, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1132 days.

(21) Appl. No.: 11/316,144

(22) Filed: Dec. 22, 2005

(51) Int. Cl.
*H04M 1/24* (2006.01)
*H04M 3/08* (2006.01)
*H04M 3/22* (2006.01)

(52) U.S. Cl. ............... 379/9.03; 379/15.05; 379/22.03; 379/33

(58) Field of Classification Search ................ 379/188, 379/9.02, 9.03, 9.04, 15.05, 22.03, 32.01, 379/33; 709/224; 725/109; 707/1
See application file for complete search history.

(56) References Cited

U.S. PATENT DOCUMENTS

| 2002/0078017 | A1* | 6/2002 | Cerami et al. ................. 707/1 |
| 2002/0087680 | A1* | 7/2002 | Cerami et al. ............... 709/224 |
| 2002/0199203 | A1* | 12/2002 | Duffy et al. ................. 725/109 |

* cited by examiner

*Primary Examiner*—Thjuan K Addy
(74) *Attorney, Agent, or Firm*—Priest & Goldstein, PLLC

(57) ABSTRACT

Problems are proactively analyzed and responded to as they are detected in a virtual private network (VPN) access path rather than waiting for a user to manually report the problem. When a problem is automatically detected, such as a failure causing degraded performance, an alarm may be generated. The alarm proactively triggers rules-based analysis procedures and isolation testing to diagnose problem in a VPN access path. Based on the testing and analysis, a comprehensive trouble ticket may be generated that is customized with specific alarm information allowing for increased efficiency in problem isolation and saving significant time and resources in resolving the problem.

20 Claims, 6 Drawing Sheets

AUTOMATED RULES BASED PROACTIVE ALARM ANALYSIS AND RESPONSE

CROSS REFERENCE TO RELATED APPLICATIONS

Patent applications entitled "Service Assurance Automation Access Diagnostics" U.S. application Ser. No. 11/316,145 and "Rules Based End-to-End Testing Diagnostics" U.S. application Ser. No. 11/315,437 both filed on Dec. 22, 2005, having the same inventors and assigned to the same assignee as the present invention are hereby incorporated by reference in their entirety.

FIELD OF INVENTION

This invention generally relates to automated diagnostic systems and procedures and, in particular, to apparatus and methods for automated rules based proactive alarm analysis and response in a network.

BACKGROUND OF INVENTION

An organization, such as a company or a group of companies, may use a virtual private network (VPN) for secure communications over a public network. Failures that affect the reliability of the VPN access circuit may occur anywhere from a user's premises through the connection path to the VPN-provider network, and may be difficult to diagnose. Failures are costly to a user as a failure may cause loss of data or down time affecting the user's normal business flow.

For example, access problems may reside at various levels in the seven layer open systems interconnection (OSI) model of computer network communication and failures of electronic components, including passive components such as cables, may surface in different communication layers. Physical layer 1 problems can occur at the cabling and signaling interface level where connections are established between network devices. Logical data link layer 2 issues may cause data errors associated with the protocols used on the access circuit. Network layer 3 problems may cause routing errors. Cross-layer interactions can complicate the identification of or otherwise mask the root cause of a component failure.

Users can access a VPN network using private lines provided by a VPN-provider, a local exchange carrier, or another alternate access provider. These private lines can be, for example, a 64 kbps circuit conforming to the digital signal 0 (DS-0) telecommunications standard, a line using NxDS-0, a 1.544 Mbps circuit using the digital signal 1 (DS-1) format, a line using NxDS-1, or the like. In many user access circuits, the lines are multiplexed into higher order facilities once they enter an access provider's network and subsequently enter the VPN provider's network. This access path, along with the access paths of many other customers, typically terminates on an optical communication hierarchy level X (OC-X) port on a gigabit switch router serving as an access point to the VPN-provider network. Failures in the access path are typically detected by a user long after a failure occurred. The user then has to deal with the consequences of the failure and report the error for service. When a user manually reports a problem in connecting to a VPN, for example, the location of the failure causing the problem is typically not easy to determine and is usually not known to the user. For example, a failure may be occurring with customer premises equipment (CPE), or with a local exchange carrier (LEC), or with the VPN provider. Due to the complexity of a customer network system, variability of equipment used, and use of different access alternatives, it may be quite time-consuming for a VPN provider to pinpoint the cause of a problem.

SUMMARY OF INVENTION

By proactively responding to failures as they are detected in a virtual private network (VPN) access path rather than waiting for a user to manually report a failure, significant time and resources may be saved in resolving the failure. When a failure is automatically detected, an alarm is generated. The alarm triggers rules based analysis procedures and isolation testing. Based on the testing and analysis, a comprehensive trouble ticket may be generated in response to the alarm. The trouble ticket is customized with specific alarm information allowing for increased efficiency in failure isolation.

Among its many aspects, the present invention addresses methods and apparatus for automated proactive alarm analysis and response. To such ends, a method in accordance with one aspect of the invention begins by receiving an alarm, the alarm being an indicator of a problem. Based on codified rules, information concerning the type of alarm and equipment associated with the alarm, an interface test, and an isolation test are determined. The interface test is then run to obtain a status of a communication path associated with the alarm. Based on the status, the isolation test is run to determine a location of the problem to within customer premises equipment (CPE) or a local exchange carrier (LEC), or within network provider equipment. A customized trouble ticket is then generated to reflect said information, said status, and said location of the problem.

Another aspect of the invention addresses a computer system for automated proactive alarm analysis and response. The computer system has a memory containing codified rules and a rules based program for running procedures that automatically respond to an alarm. Means are provided for receiving the alarm, the alarm being an indicator of a problem. Also, included in the computer system are means for determining information concerning the type of alarm and equipment associated with the alarm, an interface test, and an isolation test. This determination of information, the interface test, and the isolation test are based on codified rules. Means are provided for running the interface test to obtain a status of a communication path associated with the alarm. Means are then utilized for running, based on the status, the isolation test to determine a location of the problem to within customer premises equipment (CPE) or a local exchange carrier (LEC), or within network provider equipment. Also, means may be advantageously utilized for generating a trouble ticket customized to reflect said information, said status, and said location of the problem.

A more complete understanding of the present invention, as well as other features and advantages of the invention, will be apparent from the following detailed description and the accompanying drawings.

DETAILED DESCRIPTION

The present invention will now be described more fully with reference to the accompanying drawings, in which several embodiments and various aspects of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Figure 1:
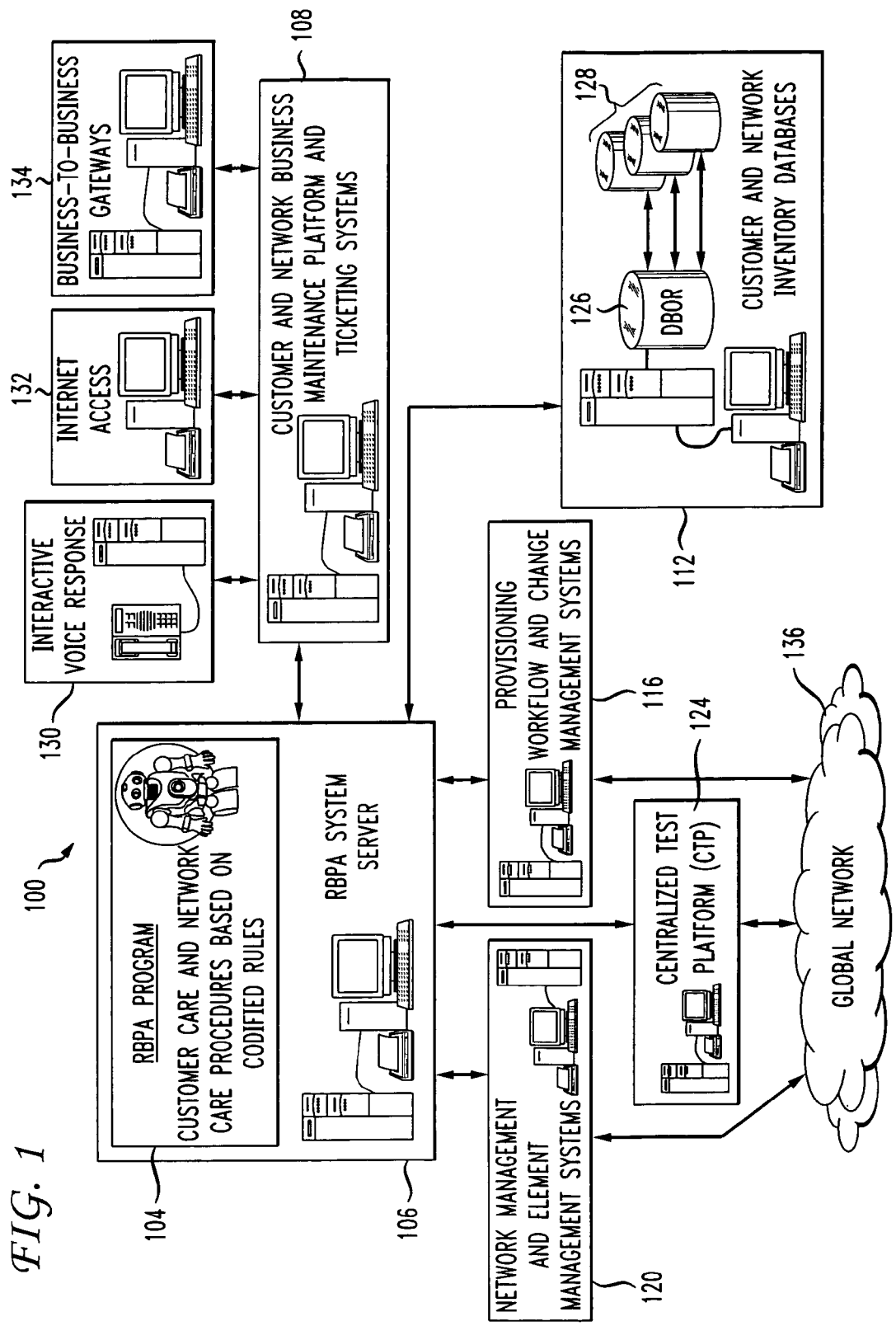
FIG. 1 illustrates an end-to-end business process automation systems architecture in accordance with the present invention.

FIG. 1 illustrates an end-to-end business process automation systems architecture 100. The end-to-end business process automation systems architecture 100 runs on an organization of servers and electronic equipment. A server, for example, is a processing system having one or more processors, memory, input/output units of high capacity and performance, such as, large capacity disk drives and high speed communication devices, and may have a keyboard, a display, and a printer. Server programs, as computer readable media, may be loaded from a disk drive or downloaded through a communication device, for example. Multiple servers are shown as used in the end-to-end business process automation systems architecture 100 and each server may be further configured as a cluster of servers to satisfy performance, capacity, and reliability requirements.

The end-to-end business process automation systems architecture 100 uses a rules based process automation (RBPA) program 104 that is operative on an RBPA system server 106. The RBPA program 104 is used to enforce the consistent application of business rules and policies and is based on predetermined procedures codified in rules. A codified rule may be a conditional statement used to influence a decision made in real time. The codified rules are managed and interpreted independently allowing the codified rules to be changed if needed without having to change the application programs that reference the codified rules. The RBPA program 104 interfaces with customer and network business maintenance and ticketing systems 108, customer and network inventory databases 112, provisioning workflow and change management systems 116, network management and element management systems 120, and a centralized test platform (CTP) 124.

The customer and network business maintenance platform and ticketing systems 108 use servers and programs to interface with an interactive voice response system 130, an Internet access portal 132, and business-to-business gateways 134. The interactive voice response system 130 uses voice recognition programs and equipment to respond to voice requests, such as, verbal problem reports called in by a user and to send verbal messages and status to users. The Internet access portal 132 uses a computing device to access the Internet and once authorized, gain access to the customer and network business maintenance platform and ticketing systems 108 to create, view, and update trouble tickets concerning, for example, problem reports. The business-to-business gateways 134 use gateway servers and computing devices to provide an access path from a private business network to a global network 136 and interface with the customer and network business maintenance platform and ticketing systems 108 to report, for example, problems with a gateway interface.

The customer and network inventory databases 112 are operative on a server running a database of record (DBOR) program 126 which facilitates the accessing of information from a plurality of databases 128. The databases 128 contain, for example, specific customer and network inventory information, including information related to alarms and support for automatic diagnostic procedures such as loop-back test procedures, useful in the analysis of problems that might occur in the customer and network systems.

The provisioning workflow and change management systems 116 are operative on servers using programs that affect the global network 136. The network management and element management systems 120 are also operative on servers using programs that affect the global network 136. For example, problems, such as customer specific alarms due to failures or degraded performance, may be automatically reported to one of the network management and element management systems 120 from a specific network element in the global network 136. The centralized test platform (CTP) 124 is operative on a server and electronic equipment to provide access paths to network elements in the global network 136 for the purposes of supporting automated test programs as directed by the RBPA program 104.

The global network 136 provides end-to-end connection services to users, a virtual private network (VPN), and interfaces with the provisioning workflow and change management systems 116, the network management and element management systems 120, and the CTP 124.

Figure 2:
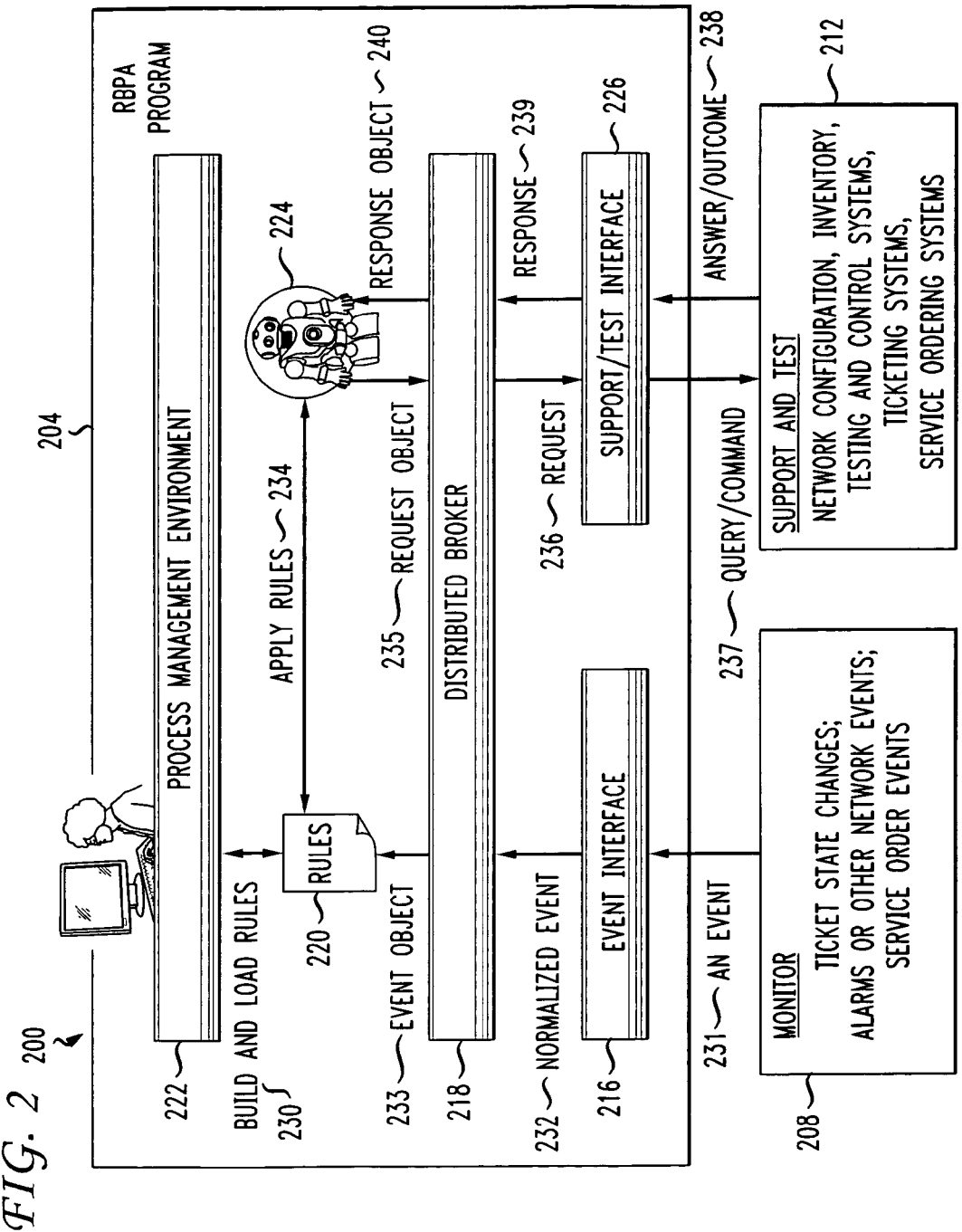
FIG. 2 illustrates a systems architecture illustrating the flow of automated diagnostic procedures in a rules based environment in accordance with the present invention.

FIG. 2 illustrates a systems architecture 200 illustrating the flow of automated diagnostic procedures in a rules based environment. The systems architecture 200 uses a rules based process automation (RBPA) program 204 to respond to events from a monitor program 208 operating on a monitoring system, such as may be found in network management and element management systems 120. An event detected by the monitor program 208 may be a change in the state of a trouble ticket, an alarm due to a detected failure, or other network problem, such as, a threshold crossing event on dropped packets, degraded performance problems on a communication path, a service order event, or the like. A response to an event may include querying for information and testing sections of a global network, such as global network 136, using support and test systems 212. The RBPA program 204 provides an event interface 216, a distributed broker 218, codified rules 220, a process management environment 222, rule agents 224, and a support/test interface 226. The support and test systems 212 include information on network configuration, inventory, and the like, testing and control systems, ticketing systems, service ordering systems, or the like.

A flow of automated diagnostic procedures is shown overlaid on the system architecture 200 to illustrate the flow of automated procedures used to diagnose alarms that have been received or problems that have been reported. In order to support automated diagnostic procedures, a set of codified rules 220 are built and loaded into the RBPA program 204 in a first step 230.

When the monitor program 208 detects a problem, such as a customer specific alarm, in its monitored systems, an event 231 is passed to the event interface 216 which generates a normalized event 232. It is noted that the monitored systems may include customer premises equipment, if so authorized by a customer. A normalized event is a common report file that is used to support multiple different types of events reported by different means. For example, an event may be reported by a voice response system 130, an Internet message from an Internet access portal 132 or a business-to-business gateway 134, an element management system alarm from network management and element management systems 120, or other means for reporting problems.

The normalized event 232 is distributed by the distributed broker 218 as an event object 233. Codified rules 220, associated with the event object 233, are selected and applied in the next step 234 by the rule agents 224. Based on the codified rules 220, a request object 235, requesting specific information, is made to the distributed broker 218. A request 236 is then forwarded to the support/test interface 226. The support/test interface passes a query/command 237 to the support and test systems 212. For example, a query may request information access from a database, such as one of the plurality of databases 128 accessed through the DBOR program 126. The query/command 237 may also be a command for automated testing of a specified component or group of components as supported by the CTP 124.

The answer/outcome response 238 of the query 237 is returned to the support/test interface 226 which forwards a response 239 to the distributed broker 218. The distributed broker 218 forwards a response object 240 to the rule agents 224 that authorized the original request object 235. The rule agents 224 then apply procedures codified in the rules to analyze attributes of the response object and may request further information be gathered, additional automated testing be done, manual testing be done, present status of diagnostic processing, request trouble ticket creation, or the like.

Figure 3:
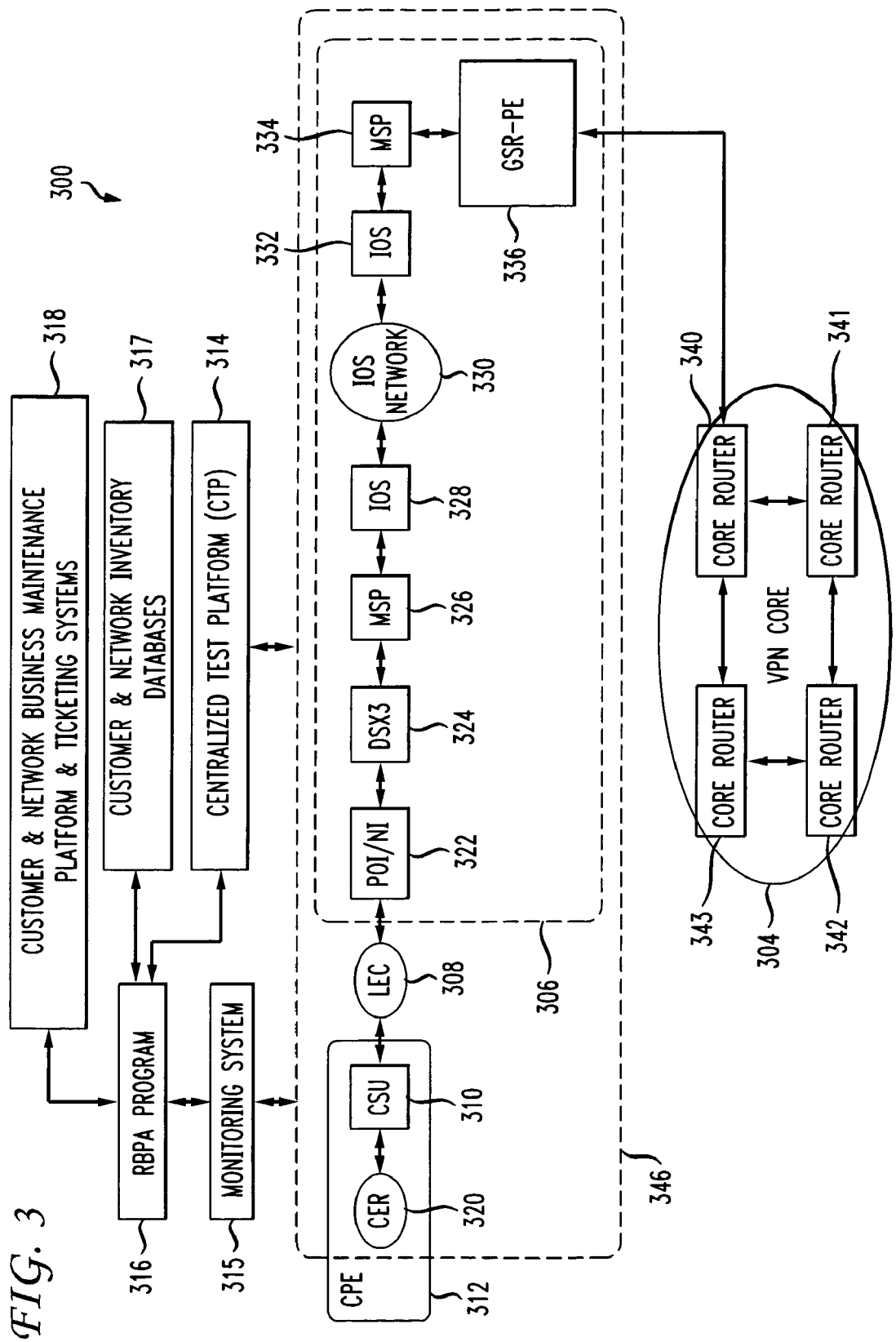
FIG. 3 illustrates an example of a typical VPN-access architecture and proactive diagnostic system in accordance with the present invention.

FIG. 3 illustrates an example of a typical VPN-access architecture and proactive diagnostic system 300. The VPN-access architecture and proactive diagnostic system 300 contains a VPN core 304, a VPN-provider access network 306, an access circuit from a local exchange carrier (LEC) 308, a customer premises equipment (CPE) 312, a centralized test platform (CTP) 314, monitoring system 315, an RBPA program 316, customer and network inventory databases 317, and customer and network business maintenance platform and ticketing systems 318. The monitoring system 315 may be part of the network management and element management system 120, for example.

When a user attempts access to the VPN core 304, messages, including alarms of any detected failures, are sent through a customer edge router (CER) 320 which connects to a channel service unit (CSU) 310. The message path then proceeds to the LEC 308, and enters the VPN-provider access network 306. The VPN-provider access network 306 is typically a complex path having many components, such as a point of interface/network interface (POI/NI) unit 322, a digital signal level 3 cross connect (DSX3) unit 324, a first multi-services platform (MSP) unit 326, a first intelligent optical switch (IOS) unit 328, an IOS-based network 330, a second IOS unit 332, a second MSP unit 334, and a gigabit switch router provider equipment (GSR-PE) unit 336. The VPN core 304 contains multiple core routers, such as core routers 340-343 that are connected to various VPN access paths, such as VPN access path 346.

Customer maintenance on VPN services is typically performed on a reactive basis by the VPN provider in response to a manually reported failure. A specific customer's VPN service is typically not monitored on an end-to-end basis, unless such monitoring is authorized by the customer. If such monitoring is not authorized, any diagnostic and repair work is not initiated until the customer recognizes the problem, reports it, and authorizes diagnostic services. If proactive alarm monitoring and maintenance is authorized and, for example, the customer's access path terminates on an optical carrier xx data rate (OCxx) card or gigabit Ethernet card in a gigabit switch router, such as GSR-PE 336, the VPN provider can proactively monitor customer specific alarms, initiate diagnostic procedures, and create customer specific trouble tickets. The customer specific trouble ticket is, for example, directed to a specific work center and equipment associated with the customer specific alarm.

Such proactive diagnostics and customer specific trouble ticket creation may be accomplished before a customer recognizes and reports the problem associated with the alarm. Since manual monitoring of customer specific alarms is time consuming and resource intensive, automated proactive monitoring, diagnostics, and ticket creation provides a more efficient solution to providing a high availability system. As is discussed in further detail below, rules based proactive procedures may provide automated proactive monitoring, diagnostics, and ticket creation and may further be easily tuned to accommodate changes in processes, equipment, and business procedures without extensive software development.

Without customer authorization for proactive monitoring, a customer is responsible for detecting and reporting problems with its VPN service. A customer reports a problem to the VPN provider using, for example, the systems depicted in FIG. 1, including interactive voice response (IVR) 130, Internet access portal 132, business to business gateways 134, or by directly calling a work or support center and talking to a technician.

This manual reporting action will result in a trouble ticket being created in the ticketing systems 108 which causes an event to be sent to the RBPA program 316. For example, a detected error is encoded in a trouble ticket providing a description of the information available to describe the error. Such information encoded on a trouble ticket may include error type, unit detecting the error, duration and frequency of the error, and the like. This information represents a change in state of a trouble ticket. The event is then processed by the flow of automated diagnostic procedures shown in the rules-based systems architecture 200. Automated diagnostic procedures may include specific tests of various devices in the VPN access path that are known by the codified rules, for example, to support loop-back testing. This diagnostic path is lengthy as it includes the time it takes a customer to recognize a problem and to report the problem before a trouble ticket can be created that instigates diagnostic procedures. In addition, the recognition and reporting of a problem may be faulty or lacking in specific information which may entail further evaluation time to specifically identify the problem.

With customer authorization for proactive alarm maintenance, a problem in the communication path to VPN service may be detected, reported, and proactively analyzed automatically, many times prior to a customer recognizing there is a problem in its VPN access. An automatically reported alarm may be recognized in the VPN-provider access network 306, for example, at the GSR-PE 336. The GSR-PE 336 reports the detected alarm to the monitoring system 315 which then forwards the alarm to the RBPA program 316. Then, based on codified rules, it is determined that the proactive monitoring, diagnostics, and trouble ticket creation process has been authorized for this specific customer. Once authorization is determined, the RBPA program 316 interacts with the centralized test platform 314 and customer and network inventory databases 317 to diagnose the problem. Upon completion of a rules-based prescribed course of diagnostics, the RBPA program 316 interacts with the customer and network business maintenance platform and ticketing systems 318. The customer and network business maintenance platform and ticketing systems 318 create a customer specific trouble ticket containing diagnostic information obtained through the customer specific diagnostic testing and refer the trouble ticket to a work center appropriate for dealing with the customer specific problem.

To support proactive automated diagnostics, equipment on the VPN access path needs to support automated testing such as loop back testing. Devices such as the channel service unit 310 and many digital cross connect systems are designed to respond to a specific code sequence of 1's and 0's in a transmission that causes the device to loop the transmission back to the sender. In the case of the CSU 310, a test message may be encoded for a loop-back test and initiated by CTP 314 acting upon a device in the VPN-provider access network 306 at the request of RBPA program 316. The CSU 310 receives the message, interprets the loop-back encoding, and sends the message back as requested by the message encoding. The sender device in the VPN-providers access network 306 then receives the test message and can evaluate the response. In this fashion, with devices that support loop-back testing, a test sequence can be setup to test to a point A in the access path, then to a point B, and so forth in order to isolate problems to a specific segment in the VPN access path 346. Prompt repair of the VPN service requires timely isolation of problems to the VPN-provider access network 306, the local exchange carrier (LEC) 308, or the customer premises equipment (CPE) 312.

If the alarm is due to a failure associated with the LEC 308, the RBPA program 316 identifies the problem as an LEC problem in a trouble ticket and sends the trouble ticket to an appropriate work center. If the alarm is due to a failure in the CPE 312 the RBPA program 316 logs the result in a customer specific trouble ticket, a message is sent to the customer, and a trouble ticket is sent to an appropriate work center. The message sent to the customer may be sent by a phone call from a work center technician or by use of an interactive voice response (IVR) system, such as the IVR 130. If the alarm is due to a failure in the VPN provider network, the RBPA program 316 identifies the problem as such in a trouble ticket and sends the trouble ticket to an appropriate work center. Based on an analysis of numerous systems, the majority of problems are due to failures detected in CPE 312 or LEC 308. By having problems proactively isolated to CPE 312, quality of service improves and time and resources are saved.

Figure 4:
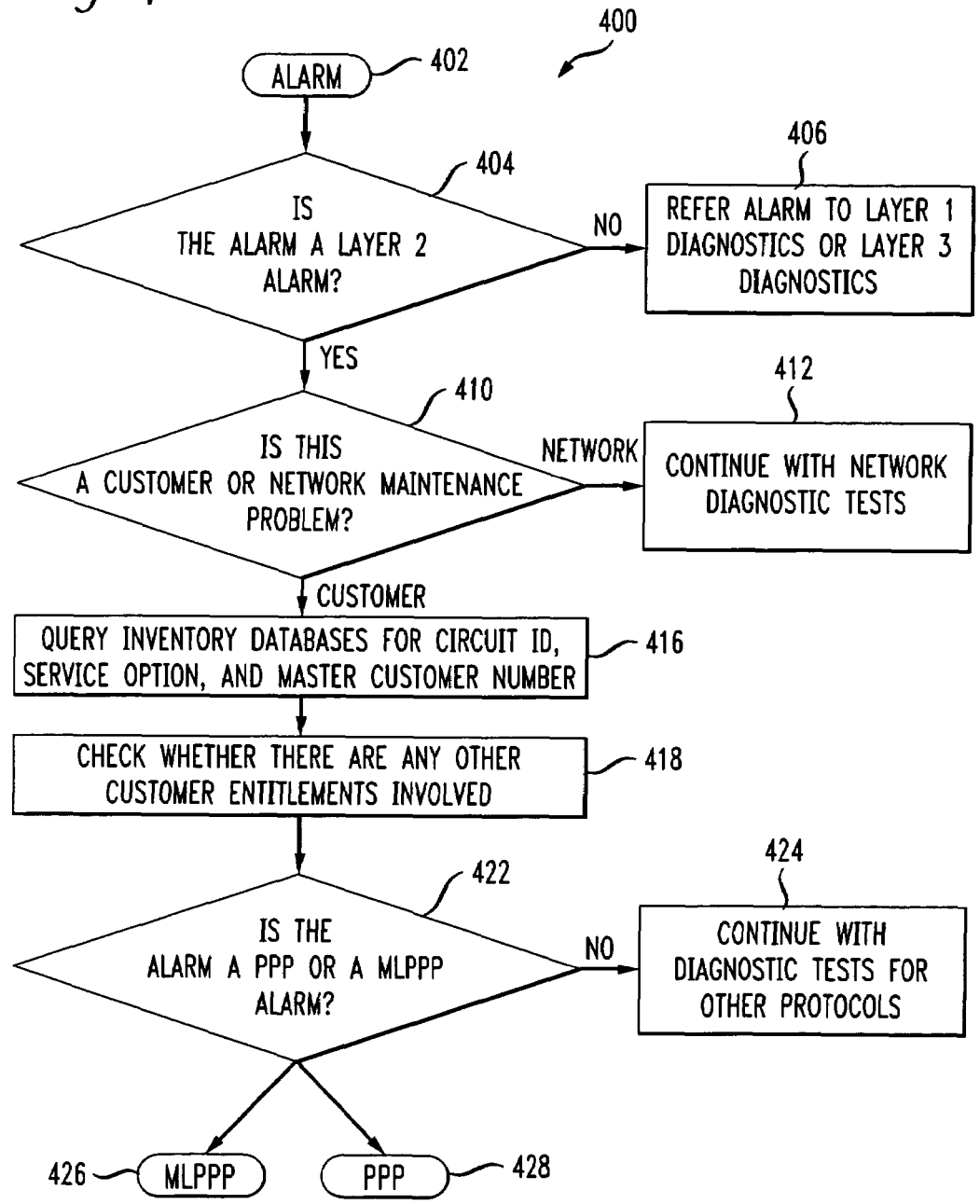
FIG. 4 illustrates a method for rules based proactive automated alarm analysis in accordance with the present invention.

FIG. 4 illustrates a method 400 for rules based proactive automated alarm analysis. An alarm 402 is received as a trigger for the method 400. The alarm 402 may be a multi-link point-to-point protocol (MLPPP) bundled T1 alarm, an MLPPP individual T1 alarm, a threshold exceeded alarm, or a low speed point-to-point protocol (LSPPP) alarm, for example. It is noted that a T1 line is a T-carrier signaling scheme used in the telecommunications industry to transmit voice and data over a communication path between devices. An MLPPP bundled T1 alarm indicates the entire T1 bundle of up to eight T1s is down. If an MLPPP bundled T1 alarm is received, it usually means that the customer has no service. An MLPPP individual T1 alarm indicates that only one T1 in a bundle of T1s is down. If an MLPPP individual T1 alarm is received, it usually means that the customer will still be able to send and receive information but will have degraded service. A threshold exceeded alarm indicates that 75% of the T1s in a bundle have problems. An LSPPP alarm indicates the customer has, for example, a T1, an intermediate bit rate (IBR) line, or digital signal 0 (DS-0) service and the service is down.

It is also noted that an alarm is instantiated as an alphanumeric string of data. The alarm contains, in the string of data, information, such as, the type of problem or failure occurring, a network equipment identifier indicating the equipment where the problem or failure was recognized, a time stamp indicating the time the problem or failure was recognized, and the like, as may be used by the diagnostic system.

The alarm 402 may be received, for example, in the GSR-PE 336 and then forwarded to the monitoring system 315. The monitoring system 315 examines the alarm data and, for example, does a table lookup from which a customer identifier is determined and added to the alarm data. The monitoring system 315 then sends the alarm to the rules based process automation (RBPA) program 316. Based on codified rules and examination of the alarm data, the RBPA program 316 determines if the alarm 402 is a layer 2 alarm in decision step 404. If it is not a layer 2 alarm, the alarm may be either a layer 1 alarm or a layer 3 alarm, for example, and is processed in step 406 by layer 1 diagnostics or layer 3 diagnostics.

If it is determined in step 404 that the alarm is a layer 2 alarm, then the process proceeds to decision step 410. In decision step 410, it is determined, by examination of the alarm data, whether the alarm should be routed to a network diagnostic and maintenance process or to a customer diagnostic and maintenance process. If the alarm is associated with network problems, the method 400 proceeds to step 412 which continues with network specific diagnostic tests.

In decision step 410, if it is determined, by examination of the alarm data, that the alarm is associated with a problem in the customer premises equipment then the inventory databases are queried in step 416. For example, the inventory databases, such as customer and network inventory databases 112, are queried in step 416 for circuit identification (ID), service option, and master customer number, and the like. The circuit identification is a unique identifier for the bandwidth assigned to a particular customer or a bandwidth unit, such as DS-0, DS-1 and the like, that is available to be assigned to a customer. The circuit ID is further linked with facility IDs which relate to specific cable paths and equipment terminations. This information is then linked to the alarm. The service option includes information on whether proactive maintenance is authorized for the customer equipment associated with the failure. The master customer number is a data element that uniquely identifies a specific customer and associated service contract for the specific network equipment associated with the failure. A customer name is typically not used, for example, since a customer may have multiple service contracts or a single service contract may identify equipment and connection paths that have different names.

In step 418, a further check is done to see if there are any other customer entitlements involved. For example, proactive alarm maintenance or certain features of proactive maintenance may be considered as entitlements for certain customers. In addition, certain customer may require status updates on detected failures to be sent every 30 minutes, while other customers may require status updates to be sent every hour. This information affects the failure diagnostic process and is kept available to be recorded in a trouble ticket, as may be necessary.

In decision step 422, it is determined, by examination of the alarm data, whether the alarm is a point-to-point protocol (PPP) or a multi-link point-to-point protocol (MLPPP). If the alarm is not a PPP or an MLPPP alarm, then the method proceeds to step 424 which continues with diagnostic tests for other protocols. If the alarm is determined to be an MLPPP alarm in decision step 422, then the method proceeds to connecting point MLPPP 426. If the alarm is determined to be a PPP alarm, then the method proceeds to connecting point PPP 428.

Figure 5A:
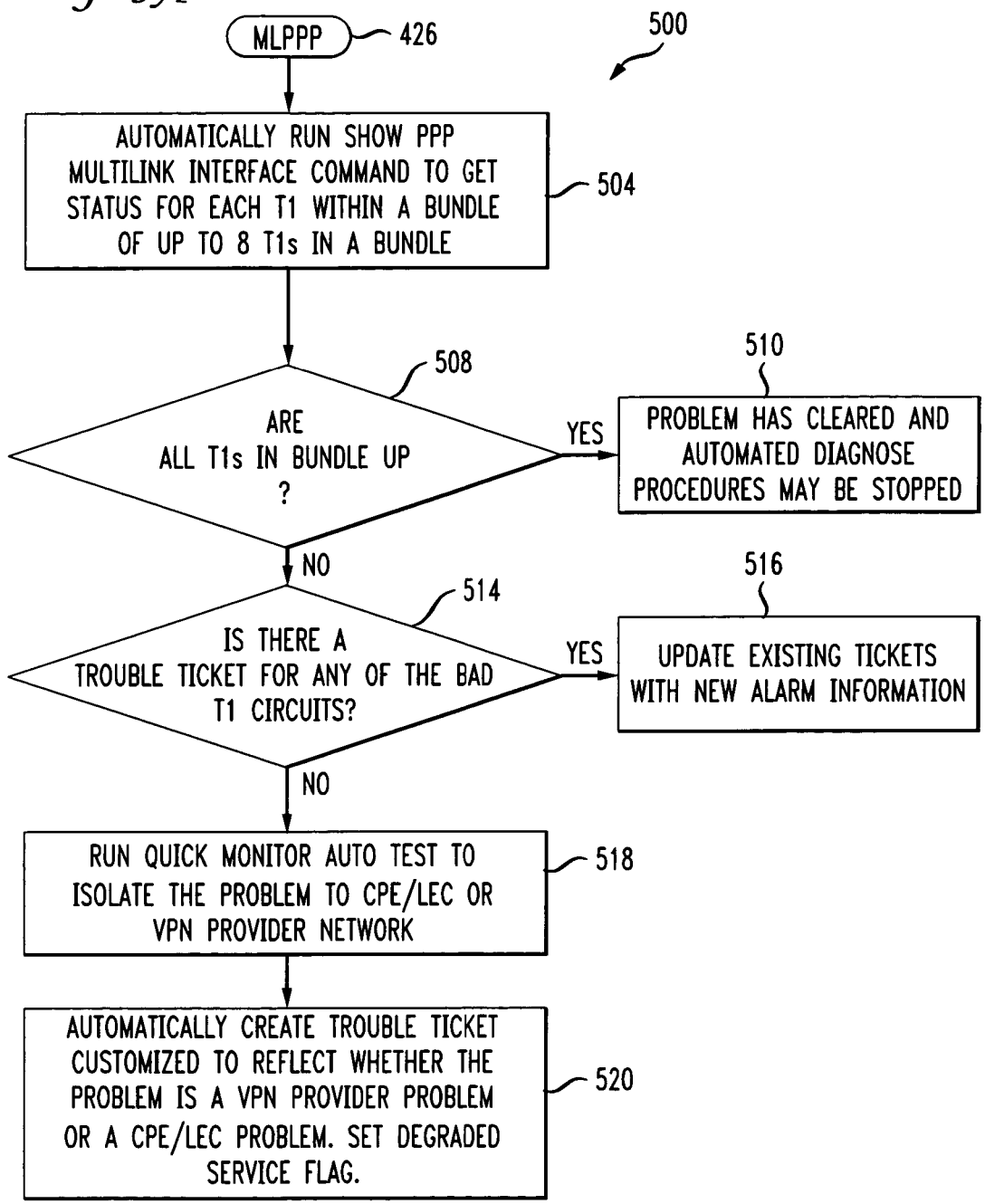
FIG. 5A illustrates a method for rules based proactive automated trouble ticket creation in response to MLPPP alarms in accordance with the present invention.

FIG. 5A illustrates a method 500 for rules based proactive automated trouble ticket creation in response to MLPPP alarms. An MLPPP alarm, such as indicated by the connecting point MLPPP 426 of FIG. 4, is received and processed in method 500 beginning with step 504. In step 504, a show PPP multi-link interface command is run for each T1 within a bundle of up to eight T1s in a bundle. The show PPP multi-link interface command provides T1 status for each T1 in the bundle. Based on the T1 status, it is determined in decision step 508 whether all T1s are up and running. If all T1s are up and running correctly, the method proceeds to step 510 in which it is noted that the problem has been cleared, recorded, and the automated diagnose procedure may be stopped.

If it is determined in decision step 508 that not all T1s are up and running, the method proceeds to decision step 514. In decision step 514, it is determined whether there is an existing trouble ticket already in the system for the identified problematic T1 circuits. If there is already a trouble ticket in the system for a failing T1, then the process proceeds to step 516. In step 516, the existing trouble tickets for each failing T1 are updated with the new alarm information. Also, in step 516, the present method 500 is ended for each failing T1 having an associated existing trouble ticket.

In decision step 514, if it is determined that a failing T1 has no existing trouble ticket, the method proceeds to step 518. In step 518, a quick monitor auto test is run as an isolation test to determine a location of the problem to the customer premises equipment (CPE)/local exchange carrier (LEC) or the VPN provider network. The quick monitor auto test may, for example, run loop back tests on selected segments of the VPN access path 346 to isolate failures. The method then proceeds to step 520. In step 520, a trouble ticket is automatically created and customized to reflect the diagnostic results and the location of the problem. A "degraded service flag" may also be set at this point to notify the work center that the customer has degraded service.

Figure 5B:
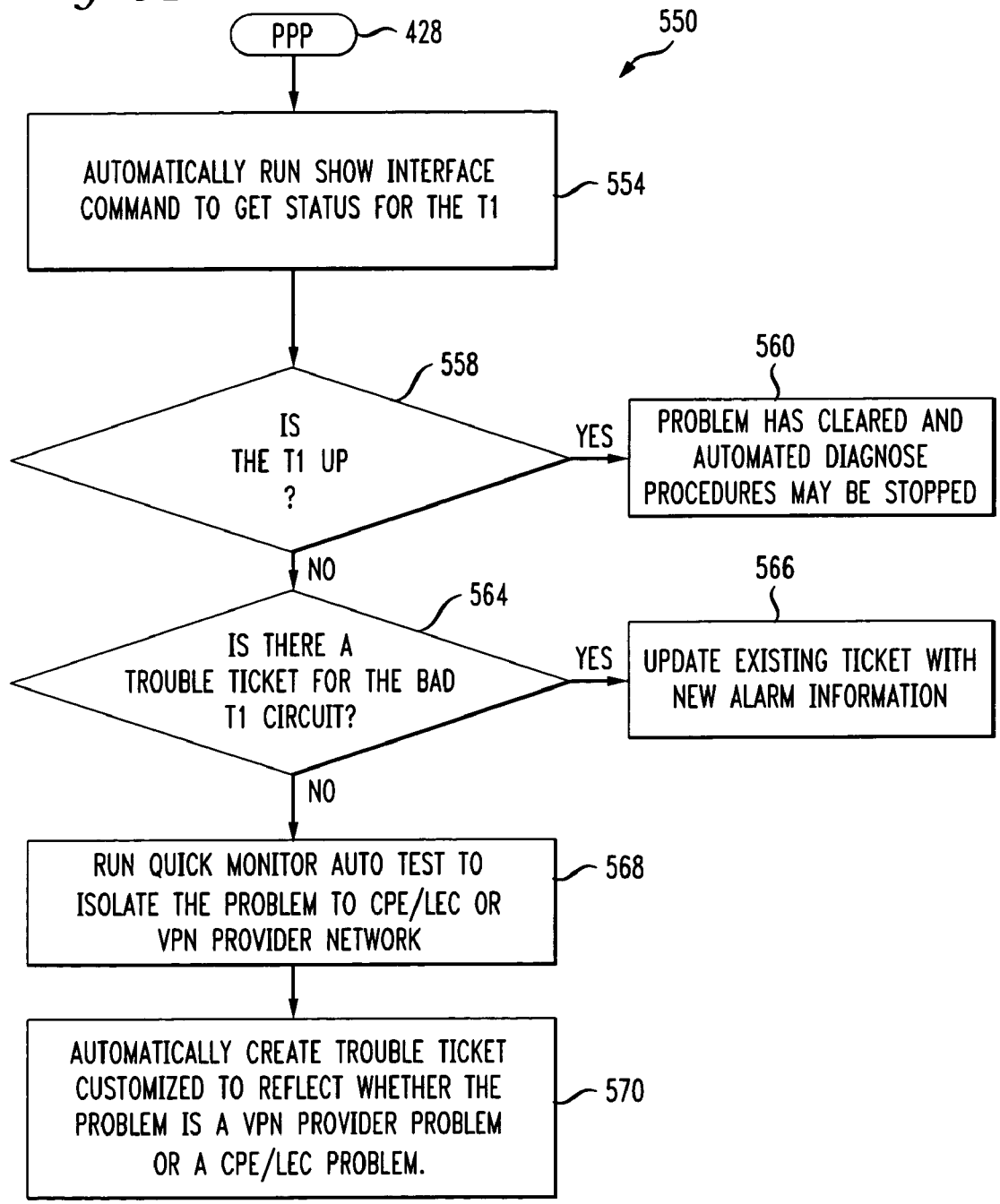
FIG. 5B illustrates a method for rules based proactive automated trouble ticket creation in response to PPP alarms in accordance with the present invention.

FIG. 5B illustrates a method 550 for rules based proactive automated trouble ticket creation in response to PPP alarms. A PPP alarm, such as indicated by the connecting point PPP 428 of FIG. 4, is received and processed in method 550 beginning with step 554. In step 554, a show interface command is run for an individual T1 to provides T1 status. Based on the T1 status, it is determined in decision step 558 if the T1 is up and running. If the T1 is up and running correctly, the method proceeds to step 560 in which it is noted that the problem has been cleared and the automated diagnose procedure may be stopped.

If it is determined in decision step 558 that the T1 is not up and running, the method proceeds to decision step 564. In decision step 564, it is determined whether there is an existing trouble ticket already in the system for the bad T1 circuit. If there is already a trouble ticket in the system for the failing T1, then the process proceeds to step 566. In step 566, the existing trouble ticket for the failing T1 is updated with the new alarm information. Also, in step 566, the present method 550 is ended for the failing T1 having an associated existing trouble ticket.

In decision step 564, if it is determined that the failing T1 has no existing trouble ticket, the method proceeds to step 568. In step 568, a quick monitor auto test is run as an isolation test to determine a location of the problem to the customer premises equipment (CPE)/local exchange carrier (LEC) or the VPN provider network. The method then proceeds to step 570. In step 570, a trouble ticket is automatically created and customized to reflect the diagnostic results and the location of the problem. A "no service flag" may also be set at this point to notify the work center that the customer has no service.

While the present invention has been disclosed in a presently preferred context, it will be recognized that the present teachings may be adapted to a variety of contexts consistent with this disclosure and the claims that follow.

For example, the present invention is disclosed mainly in the context of automated proactive analysis and response to alarms. It will be appreciated that variations in the particular hardware and control process employed are feasible, and to be expected as both evolve with time. For example, detailed layer 1 diagnostic information on failures may be processed proactively as well as layer 3 diagnostic information. Other variations may include different approaches to isolation tests as variations or extensions to the quick monitor auto test. Other such modifications and adaptations to suit a particular design application will be apparent to those of ordinary skill in the art.

We claim:

1. A method for automated proactive alarm analysis and response comprising:
   receiving an alarm in a rules based program as a normalized event that supports multiple types of monitored problems, the alarm being an indicator of a problem in a virtual private network (VPN) access path;
   determining, based on codified rules associated with the normalized event, information concerning the type of alarm and equipment associated with the alarm, an interface test, and an isolation test;
   running the interface test initiated by a first request from the rules based program to a centralized test platform which connects to the VPN access path to obtain a status of the VPN access path associated with the alarm;
   running, based on the status, the isolation test initiated by a second request from the rules based program to the centralized test platform to determine a location of the problem to within customer premises equipment (CPE) or a local exchange carrier (LEC) equipment, or within network provider equipment; and
   generating a trouble ticket customized to reflect said information, said status, and said location of the problem.

2. The method of claim 1 wherein the alarm contains a string of data indicating the type of problem and a network equipment identifier associated with the problem.

3. The method of claim 1 wherein the type of alarm is a multi-link point-to-point protocol (MLPPP) alarm associated with a bundle of T1 lines having at least one T1 line not operative.

4. The method of claim 1 wherein the type of alarm is a low speed point-to-point protocol (LSPPP) alarm.

5. The method of claim 3 wherein the interface test includes tests of individual links in an MLPPP connection.

6. The method of claim 4 wherein the interface test is a test of a link in an LSPPP connection.

7. The method of claim 1 further comprising:
   determining a trouble ticket already exists for the alarm based on said information and said status; and
   updating the existing trouble ticket based on said information and said status.

8. The method of claim 1 wherein the trouble ticket is a marker that instigates further problem resolution actions.

9. A computer system for automated proactive alarm analysis and response comprising:
   memory containing codified rules and a rules based program for running procedures that automatically respond to a normalized event, wherein the normalized event is a report file that is used to support multiple different types of monitored problems;

means for receiving an alarm as the normalized event in the rules based program, the alarm being an indicator of a problem in a virtual private network (VPN) access path;

means for determining, based on the codified rules associated with the normalized event, information concerning the type of alarm and equipment associated with the alarm, an interface test, and an isolation test;

means for running the interface test initiated by a first request from the rules based program to a centralized test platform which connects to the VPN access path to obtain a status of the VPN access path associated with the alarm;

means for running, based on the status, the isolation test initiated by a second request from the rules based program to the centralized test platform to determine a location of the problem to within customer premises equipment (CPE) or a local exchange carrier (LEC) equipment, or within network provider equipment; and means for generating a trouble ticket customized to reflect said information, said status, and said location of the problem.

10. The computer system of claim 9 further comprising:
a monitoring system for receiving the alarm from the VPN access path, updating alarm data with associated customer identification, and sending the alarm and updated alarm data to the rules based system which generates the normalized event.

11. The computer system of claim 9 further comprising:
an inventory database storing information associated with the alarm.

12. The computer system of claim 9 wherein the interface test is initiated by a show point-to-point protocol multilink interface command to provide status of T1 lines in a bundle of T1 lines.

13. The computer system of claim 9 wherein the interface test is initiated by a show interface command.

14. The computer system of claim 9 wherein the centralized test platform controls and monitors the isolation test.

15. The computer system of claim 9 further comprising:
an interactive voice response system for communicating status of a detected failure to an affected customer on a periodic timetable until a resolution is reached.

16. The computer system of claim 9 wherein the rules based program contains rule agents that select and apply the codified rules to determine a sequence of diagnostic steps.

17. A computer readable medium whose contents cause a computer system to perform automated proactive alarm analysis and response comprising:
receiving an alarm in a rules based system as a normalized event that supports multiple types of monitored problems, the alarm being an indicator of a problem in a virtual private network (VPN) access path;

determining, based on codified rules associated with the normalized event, information concerning the type of alarm and equipment associated with the alarm, an interface test, and an isolation test;

running the interface test initiated by a first request from the rules based system to a centralized test platform which connects to the VPN access path to obtain a status of the VPN access path associated with the alarm;

running, based on the status, the isolation test initiated by a second request to the rules based system to the centralized test platform to determine a location of the problem to within customer premises equipment (CPE) or a local exchange carrier (LEC) equipment, or within network provider equipment; and generating a trouble ticket customized to reflect said information, said status, and said location of the problem.

18. The computer readable medium of claim 17 wherein the equipment information includes a circuit identification, a service option in effect, and a master customer number that uniquely identifies a specific customer and service contract.

19. The computer readable medium of claim 18 wherein the circuit identification is associated with a facility identification that specifies cable paths and equipment terminations.

20. The computer readable medium of claim 18 wherein the service option in effect authorizes proactive alarm maintenance for the master customer number.

* * * * *